Nov. 6, 1934.   J. L. ANDERSON   1,979,244
WELDING TIP
Filed April 1, 1931

INVENTOR
James L. Anderson
BY
J. J. Brandenburg
ATTORNEY

Patented Nov. 6, 1934

1,979,244

UNITED STATES PATENT OFFICE 1,979,244

WELDING TIP

James L. Anderson, Tenafly, N. J., assignor to Air Reduction Company, Incorporated, New York, N. Y., a corporation of New York Application April 1, 1931, Serial No. 527,032

18 Claims. (Cl. 113—59)

In the welding of metal by creating therein fusion temperatures at such parts as are to be united, the oxy-fuel gas burner has found wide application. In the use of such apparatus it has been found desirable to prepare the portions to be welded by cutting away, or otherwise forming them, so that when brought into the relation in which they are to be welded a distinct recess or trough is formed. This recess, serves a number of different purposes among which are the following.

First of all, such recess is devised to permit heat from the burner to strike at and be absorbed by metal on the bottom faces of the portion and weld such metal together. By welding with the edges forming the recess, and progressively from the bottom toward the top, inability to interfuse the contiguous portions of the members, due to failure of heat transmission in sufficient quantities through the metal, is avoided. The end faces are directed toward the descending gases and present their surfaces, the area of which is greater than that of a vertical face, immediately in the path of such gases to absorb their heat.

The recess also provides a cup or mold within which metal, fused from the walls of the recess and from other sources to be more fully dealt with, may be received and cast in forming between the portions the bond so peculiar to autogenous welding. It is apparent that it would not be possible to build up the metal cast within the recess to the level of the parent metal merely by melting away such parent metal. For the purpose of building up such recess not only to the level of the parent metal but, in some cases, above its level to form a substantial reinforcement, metal has been supplied from some external source, such as wire or rod held in the flames of the burner and thus melted into and with the metal fused from the walls of the recess. By controlling the amount of metal thus fed, the level of the metal at the recess is governed effectively.

With mechinical operation, the effort has been to attain high welding speeds. But such increased speed of welding has raised the problem of providing some method of feeding additional metal to the weld at a sufficient rate that the joint to be produced may have the required contour or reinforcement. If the rod or wire is not melted fast enough the effect is not merely that insufficient metal is deposited, but also that the rod, particularly if a thick rod is used, will rob the melted metal of heat, with the result that such weld as is obtained will lack strength and homogeneity.

In the customary welding procedure in mechanical operations, a continuous metallic member of wire thickness has been the source of metal added to the weld. For high speed welding the use of such wire has become less practical.

The use of welding rod, such as is customarily used in hand welding operations, and which usually is of an approximate diameter of one-quarter of an inch, has been considered. Such rod is to be fed into the molten metal in substantially the same manner as wire is now fed. To overcome the heat-robbing effect of introducing a rod of such size and to enable it to be melted and its metal to be incorporated in the weld at a rate commensurate with the speed at which the parent metal can be sufficiently heated or melted, this invention provides apparatus and method whereby the rod is heated at a plurality of regions or over a considerable portion of its length as it descends toward the seam. Provision has been made heretofore for specially heating a welding wire or rod, but not in the manner disclosed herein.

The invention is not intended to be restricted to the specific construction and arrangement of parts herein shown and described, nor to the specific methods of operation, nor to the various details thereof, as the same may be modified in various particulars or be applied in many varied relations without departing from the spirit and scope of the invention, a practical embodiment of which has been set forth without attempting to show all the various forms and modifications in which the invention might be embodied.

In the accompanying drawing forming a part hereof:

Figure 1:
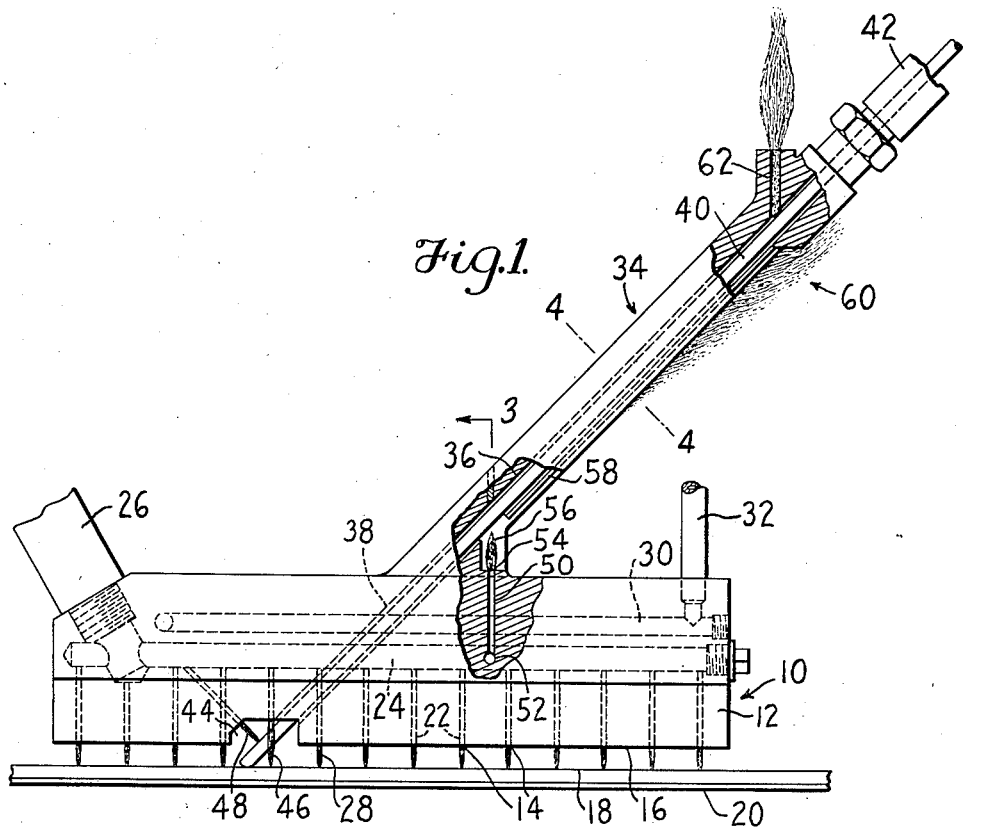
Fig. 1 is an elevational view of a torch tip into which the invention has been embodied, portions being broken away to illustrate the construction of the rod heating means.
Figure 2:
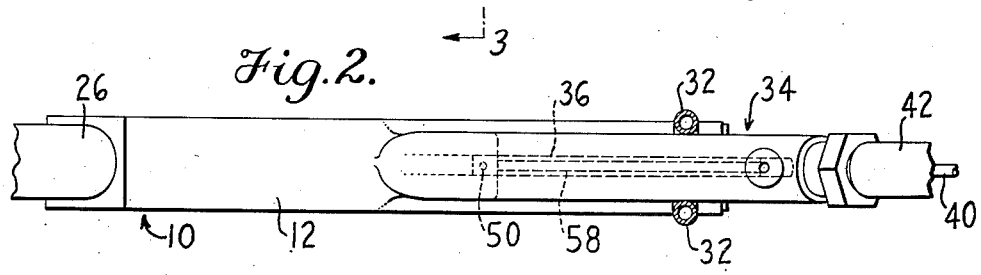
Fig. 2 is a plan view of the tip shown in Fig. 1.
Figure 3:
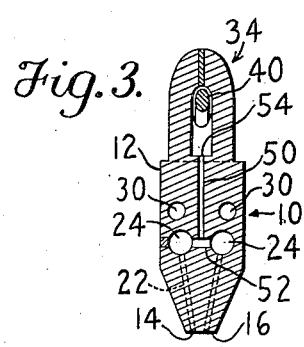
Fig. 3 is a transverse vertical sectional view, on the line 3—3 of Fig. 1.
Figure 4:
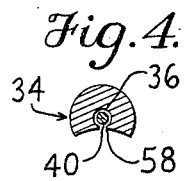
Fig. 4 is a transverse sectional view on the line 4—4 of Fig. 1.

In the burner tip 10, shown in the drawing, the body 12 may be of any particular cross-section or construction, for example such as that shown in my Patents #1,438,285, dated December 12, 1922 and #1,516,486, dated November 25, 1924, in which a plurality of orifices 14 open from a face 16 to be directed downwardly at the surface 18 of sheet metal members 20 or other similar material to be welded. The orifices are the terminations of passages 22 which are drilled through the body to supply passages 24, which in turn are connected to a supply connection 26 from which a mixture of gases, such as oxygen and a fuel gas, preferably acetylene, is supplied for producing the flame jets 28, burning at the orifices. Other passages 30 may be formed in the body to communicate with the conduits 32 for supplying a cooling fluid for well known purposes.

Secured to body 12, in any suitable manner, either by being formed integrally therewith or being attached thereto, is a rod heater body 34. The disposition of this body relative to the tip body is such that a passage 36 in the former communicates with a passage 38 in the latter, so that metallic rods 40 may be fed from an external position, through a tube 42, down through the tip body, to emerge at a cut-out 44, there to be attacked by jets 46 and 48 which melt the rod into the weld.

As shown, the rod heater and tip bodies are so related that the passages 36 and 38 will deliver the rod at an angle to the molten metal and to the jets 46 and 48, the particular angular disposition being predeterminedly fixed by factors of speed of welding, number of jets acting upon the rod at its exit from the passages, disturbance of the fused metal, and similar matters. Beyond the tube 42 may be disposed any suitable or known means for feeding the rod or wire and for controlling the speed at which the rod is fed to the weld. However, the feeding of the rod may be left partly and even entirely to gravity, the rod sliding down through the passages to cut-out 44, as the end thereof is melted off by jets 46 and 48, the end actually reposing in the fused metal and resting upon the solid bottom of the weld at this point. Hot gases from jets 46 and 48 will also tend to rise through passage 38, thus maintaining the rod in a hot gas bath during its feeding.

In order to present the rod at the cut-out 44 in such condition that jets 46 and 48 will reduce it in the very short period of their action to molten state, it is strongly preheated in a particular manner before its arrival at the cut-out. The jets 46 and 48 are relieved completely, or at least to a substantial degree, of the work of raising the temperature of the rod from the cold condition in which it is delivered to the apparatus to a temperature approximating a dull red, or even higher; the jets 46 and 48 are thus freed to concentrate their heat upon adding little more than the latent heat of fusion, thereby permitting greater quantities of additional metal to be melted into the seam, within a predetermined time interval. For the purpose of illustrating the preferred embodiment of the invention, passage 50 has been shown drilled upwardly from a cross-passage 52, connecting the two passages 24 and leading a supply of a combustible mixture to the orifice 54. The flame jet 56, which is directed from orifice 54, pours hot, burning gases up through a slot 58, which extends through the bottom face of the retort body 34 and longitudinally therealong, opening into the passage 36 within the body. The particular location of the orifice 54 relative to the retort and tip bodies is not vital; it is important, however, that the jet gases be directed toward the slot and at the time of their greatest velocity be forced into the passage 36 and there to come into direct contact with the rod 40.

Slot 58 preferably is so proportioned as to provide a depression which will act positively to guide the burning gases from jet 56 upwardly, the gases passing into the passage and around the rod as it passes downwardly through the passages. Preferably, the width of the slot at its intersection with passages 36 is less than the diameter of the rod intended to be used, assuring retention of the rod against movement downwardly out of the passage while passing the slot. Retention of the rod in the passage may also be effected by positioning a plurality of ribs transversely of the slot at longitudinally spaced apart points.

In either case, gases passing up through the slot will attack and heat the rod, the coldest portion of the rod, at its entrance to passage and at the upper end of the slot, being subjected to the action of the gases in their coldest condition; thereafter, the rod, progressively increasing in temperature, is subjected to hotter gases, until in its hottest condition it will be attacked directly by the flames from jet 56 itself. The gases, burning along the slot and in the passage, will finally discharge at 60 at the upper end of the slot, or through a vent 62 positioned on the upper face of the body 34.

Many other changes could be effected in the particular apparatus designed, and in the operation and specific details thereof without substantially departing from the invention which is intended to be defined in the accompanying claims, the specific description merely illustrating one operative means capable of carrying out the spirit of the invention. While the use of welding rod has been referred to more particularly, it will be understood that the invention is also applicable to welding with smaller rod or wire.

I claim:

1. In apparatus for welding, a body having a plurality of orifices opening from a face thereof, a member extending upwardly from said body, a passage through said body and said member and opening at one of said orifices, the remainder of said orifices being disposed to direct a plurality of flame jets simultaneously at a surface, said passage providing means for feeding additional metal downwardly to the surface against which said flame jets are directed, and an orifice opening into said passage to direct a flame jet upwardly along such additional metal, said member having a vent opening adjacent the upper extremity thereof.

2. In apparatus for welding, a body having a plurality of orifices opening from a face thereof, a member on said body, a passage through said body and said member and opening at one of said orifices, the remainder of said orifices being disposed to direct a plurality of flame jets simultaneously at a surface, said passage providing means for feeding additional metal to the surface against which said flame jets are directed, and other flame jet means directed to heat said additional metal in said passage before it arrives at the exit of said passage.

3. In apparatus for welding, a body having a plurality of orifices opening from a face thereof, a member on said body, a passage through said body and said member and opening at one of said orifices, the remainder of said orifices being disposed to direct a plurality of flame jets simultaneously at a surface, said passage providing means for feeding additional metal to the surface against which said flame jets are directed, said member having an opening longitudinally thereof into said passage, and an orifice opening into said passage to direct a flame jet at such additional metal.

4. In apparatus for welding, a body having a plurality of orifices opening from a face thereof, a member on said body, a passage through said body and said member and opening at one of said orifices, the remainder of said orifices being disposed to direct a plurality of flame jets simultaneously at a surface, said passage providing means for feeding additional metal to the surface against which said flame jets are directed, and a flame jet orifice opening into said passage above said body.

5. In apparatus for welding, a body having a plurality of orifices opening from a face thereof, a member on said body, a guide passage through said body and said member and opening at one of said orifices in the face, the remainder of said orifices being disposed to direct a plurality of flame jets simultaneously at a surface, and a flame jet orifice opening into said passage above its lower end.

6. In apparatus for welding, a body having a plurality of orifices opening from a face thereof, a passage through said body opening at one of said orifices, the remainder of said orifices being disposed to direct a plurality of flame jets simultaneously at a surface, said passage providing means for feeding additional metal downwardly to the surface against which said flame jets are directed, and an orifice opening into said passage to direct a flame jet upwardly along such additional metal.

7. A fusion welder having an elongated tip block constructed to deliver a seamwise extended collection of heating and welding jets, a rod or wire channel passing between the jets, and flame jet passages in the block directed to play jets on the welding rod both above and below the block.

8. In a fusion welder, a multiple jet tip structure adapted to deliver a seamwise extended arrangement of heating and welding jets, a channel for conducting a weld metal rod or wire through the structure, and means for subjecting the rod to intense heat both where it enters and where it leaves said channel.

9. In a fusion welder, the combination of a multiple jet machine welding tip provided with a channel adapted to conduct a flow of heated envelope gases, a guide extending above said tip, and a tube for conducting a weld metal rod or wire to said guide, there being a flame heating means adjacent the junction of the guide and the tip and an escape port for the gases to issue to the atmosphere after passing through said channel and said guide without passing through the length of said tube.

10. A fusion welder having means for forming and delivering a seamwise extended arrangement of heating and welding jets, said welder having a guide for conducting a weld metal rod or wire in a general rearward direction so that its metal is fused and enters the weld toward the rear end of the welder, and being further provided with jets disposed to heat the rod before it passes below the bottom of the welder, said jets being positioned at both ends of said guide.

11. A fusion welder comprising an elongated tip structure constructed to deliver a laterally spaced and seamwise extended arrangement of heating and welding jets, means for conducting a weld metal rod or wire in a substantially rearward direction to the under side of said tip structure to the region of the welding jets, means for delivering a plurality of special rod heating jets from orifices higher up than the orifices of the other jets so as to heat the rod at a region above where it enters the molten puddle, said jets being so arranged as to heat the rod above and below the tip structure and said conducting means being of sufficient diameter to permit substantial quantities of the heated envelope gases to pass therethrough.

12. A seam welding process, which comprises preheating the seam by many closely spaced high temperature oxyacetylene flames, preheating the welding rod by a few widely spaced high temperature oxyacetylene flames, further preheating the rod by surrounding it with highly heated envelope gases where it passes between said relatively widely spaced flames, and fusing the preheated welding rod and the preheated seam together by further application of high temperature flames.

13. A seam welding process, which comprises preheating the same by many closely spaced high temperature oxyacetylene flames, preheating the welding rod by a high temperature oxyacetylene flame, causing the envelope gases of said flame to burn over a substantial distance lengthwise of said rod to preheat it additionally, and fusing the preheated welding rod and the preheated seam together by further application of high temperature flames.

14. A welder, comprising a burner body having a passage into which a welding rod or wire is fed, means for directing a flame upon said rod as it is being fed into said passage, an enclosure preventing ready access of air to one side of said flame, a conduit for the wire being fed to said body extending obliquely upwardly from the burner to receive hot gases from said flame, said conduit being open to the atmosphere along its lower side.

15. In torch welding apparatus wherein a wire or rod is guided to the welding zone, the combination of means for delivering a flame jet to heat the descending rod, and means for conducting burning gases from said flame upwardly along the rod, said conducting means being slotted to admit air to burn the gases enveloping the rod.

16. In torch welding apparatus wherein a wire or rod is guided to the welding zone, the combination of means for directing a flame jet upwardly to heat the descending rod, and means for conduction the hot burning gases from said flame jet upwardly along the rod and in contact with atmospheric air to preheat the rod over a substantial lengthwise distance.

17. In apparatus for welding, a body having a plurality of downwardly directed orifices opening from a bottom face thereof, an upwardly directed orifice opening from a top face thereof, and a passage through said body having an inlet opening at said top orifice and an outlet opening at said bottom orifices, and gas-supplying passages in said body communicating with all of the orifices.

18. In apparatus for welding, a body having a plurality of downwardly directed flame jet orifices opening from a bottom face thereof, an upwardly directed flame jet orifice opening at the top thereof, and means providing a rod guide passage leading to and extending through said body and having its rod exit at said bottom orifices, said rod guide passage being provided intermediate its ends with an opening at said upwardly directed orifice, and gas-supplying passages in said body communicating with all of said flame jet orifices.

JAMES L. ANDERSON.